US012641214B2

(12) United States Patent
Maria Peeters et al.

(10) Patent No.: US 12,641,214 B2
(45) Date of Patent: May 26, 2026

(54) METHOD FOR REDUCING DISCLINATIONS IN A 2D/3D SWITCHABLE AUTOSTEREOSCOPIC DISPLAY

(71) Applicant: Dimenco Holding B.V., Veldhoven (NL)

(72) Inventors: Patrick Godefridus Jacobus Maria Peeters, Veldhoven (NL); Pieter Wilhelmus Theodorus de Jong, Hertogenbosch (NL)

(73) Assignee: Dimenco Holding B.V., Veldhoven (NL)

( * ) Notice: Subject to any disclaimer, the term of this patent is extended or adjusted under 35 U.S.C. 154(b) by 0 days.

(21) Appl. No.: 18/876,084

(22) PCT Filed: Jun. 17, 2023

(86) PCT No.: PCT/NL2023/050341
§ 371 (c)(1),
(2) Date: Dec. 17, 2024

(87) PCT Pub. No.: WO2023/244117
PCT Pub. Date: Dec. 21, 2023

(65) Prior Publication Data
US 2025/0386000 A1      Dec. 18, 2025

(30) Foreign Application Priority Data

Jun. 17, 2022    (NL) ...................................... 2032216

(51) Int. Cl.
*H04N 13/359* (2018.01)
*G09G 3/02* (2006.01)
(Continued)

(52) U.S. Cl.
CPC ........... *H04N 13/359* (2018.05); *G09G 3/025* (2013.01); *G09G 3/3208* (2013.01);
(Continued)

(58) Field of Classification Search
CPC .. H04N 13/359; H04N 13/305; H04N 13/398; G09G 3/025; G09G 3/3208; G09G 3/3611; G09G 2320/068
See application file for complete search history.

(56) References Cited

U.S. PATENT DOCUMENTS 8,692,871 B2      4/2014   Harrold et al.
2010/0328440 A1*  12/2010   Willemsen ............. G02B 30/30
                                          348/51
(Continued)

FOREIGN PATENT DOCUMENTS

TW          201329526         7/2013
TW          I470280 B         1/2015
(Continued)

OTHER PUBLICATIONS

"International Application Serial No. PCT/NL2023/050341, International Search Report mailed Sep. 8, 2023", 4 pgs.
(Continued)

*Primary Examiner* — Thai Q Tran
*Assistant Examiner* — Jose M Mesa
(74) *Attorney, Agent, or Firm* — Schwegman, Lundberg & Woessner, P.A.

(57) ABSTRACT

The invention relates to a method for reducing disclinations in an autostereoscopic display device that is electrically switchable between a 2D view mode and a 3D view mode, wherein the method comprises varying the angle between two directions of liquid crystal alignment in the lenticular device, to thereby determine an angle that causes a minimal or an acceptable occurrence of disclinations after switching between both view modes. The invention further relates to an autostereoscopic display device that exhibits reduced disclinations when switching between both view modes.

17 Claims, 3 Drawing Sheets

(51) Int. Cl.

| | | |
|---|---|---|
| *G09G 3/3208* | (2016.01) | |
| *G09G 3/36* | (2006.01) | |
| *H04N 13/305* | (2018.01) | |
| *H04N 13/398* | (2018.01) | |

(52) U.S. Cl.
CPC ......... *G09G 3/3611* (2013.01); *H04N 13/305* (2018.05); *H04N 13/398* (2018.05); *G09G 2320/068* (2013.01)

(56) References Cited

U.S. PATENT DOCUMENTS

| | | | | |
|---|---|---|---|---|
| 2011/0181706 A1* | 7/2011 | Harrold | .................. | G02B 30/27 |
| | | | | 359/290 |
| 2013/0038811 A1* | 2/2013 | Sugita | ................... | G02B 30/25 |
| | | | | 349/96 |
| 2014/0022619 A1* | 1/2014 | Woodgate | .......... | G02B 27/0093 |
| | | | | 359/240 |
| 2014/0198271 A1 | 7/2014 | Kizu et al. | | |
| 2015/0153578 A1* | 6/2015 | Oka | ....................... | G02B 30/27 |
| | | | | 349/15 |
| 2015/0219970 A1* | 8/2015 | Liu | ........................... | G02F 1/29 |
| | | | | 349/12 |
| 2020/0050063 A1* | 2/2020 | Yoshida | ............ | G02F 1/134336 |
| 2021/0405403 A1 | 12/2021 | Harrold et al. | | |
| 2022/0146890 A1 | 5/2022 | Peeters et al. | | |

FOREIGN PATENT DOCUMENTS

| | | |
|---|---|---|
| TW | 202414041 A | 4/2024 |
| TW | I878924 | 4/2025 |
| WO | WO-2023244117 A1 | 12/2023 |

OTHER PUBLICATIONS

"International Application Serial No. PCT/NL2023/050341, Written Opinion mailed Sep. 8, 2023", 10 pgs.

"Taiwanese Application Serial No. 112122790, Office Action mailed Apr. 2, 2024", w/ English Translation, 11 pgs.

\* cited by examiner

METHOD FOR REDUCING DISCLINATIONS IN A 2D/3D SWITCHABLE AUTOSTEREOSCOPIC DISPLAY

CROSS-REFERENCE TO RELATED APPLICATION

This application is a U.S. National Stage Filing under 35 U.S.C. 371 from International Application No. PCT/NL2023/050341, filed on Jun. 17, 2023, and published as WO 2023/244117, which claims priority to Netherlands Patent Application No. 2032216, filed Jun. 17, 2022, each of which applications are incorporated herein by reference in their entirety.

FIELD OF THE INVENTION

The invention relates to a method for reducing disclinations in an autostereoscopic display device that is electrically switchable from a first view mode to a second view mode; and to an autostereoscopic display device that is electrically switchable from a first view mode to a second view mode.

BACKGROUND

Displays capable of electrically switching between two-dimensional and three-dimensional view modes, commonly known as 2D/3D switchable autostereoscopic displays, have attracted great attention in the last two decades. A common approach is to line an array of pixels with a lenticular device that comprises an array of semi-cylindrical micro-lenses (lenticulars) adjacent to a liquid crystal medium which can switch between two liquid crystalline orientations under the influence of an electrical field. In a first orientation, the director of the liquid crystal medium is in the plane of the display; and in a second orientation the director of the liquid crystal medium is perpendicular to the plane of the display.

In such set-up, each lenticular is associated with a group of at least two columns of (sub-)pixels that extend parallel with the lens, or under an angle thereto (slanted). Pixel output travelling through the lenticular device is subject to the optical properties of the lenticulars and the liquid crystal medium. The refractive index of the lenticulars is fixed, but the refractive index of the adjacent liquid crystal medium can be switched between two values by switching between the two liquid crystalline orientations; a first refractive index corresponds to light polarized along the director of the liquid crystal, and a second refractive index corresponds to light polarized perpendicular to the director. As the pixel output travels substantially perpendicular to the plane of the display, it 'sees' either the first or the second refractive index. In a first view mode, the liquid crystal medium is in the first orientation. Its refractive index matches that of the lenticulars, thereby depriving the lenticulars from a focusing effect and causing the lenticular device to behave as a transparent and flat optical panel. This forms the two-dimensional view mode of the autostereoscopic display. In a second view mode, the liquid crystal medium is in the second liquid crystalline orientation. The refractive indexes do not match, which allows each lenticular to exhibit a focusing effect. This makes it possible to direct the output from different pixel columns to different spatial positions in front of the display, which on its turn allows a viewer to perceive a three-dimensional image composed of a left image and a right image. This forms the three-dimensional view mode of the autostereoscopic display. It will thus be clear that a well-controlled switching between liquid crystalline orientations has become crucial in the design of displays that can switch between two-dimensional and three-dimensional view modes.

A switch from one liquid crystalline orientation to another occurs by changing the electrical field which the liquid crystalline material is subject to. This usually entails either applying an electrical field (in the case there was no such field), or switching off an electrical field (in the case it was subject to such field). It is important that the liquid crystal orientation changes homogeneously upon such change in the electric field. This is often however not the case. It is then observed that different domains with different liquid crystal orientation form in the liquid crystal medium. At the boundaries of these domains, there is an abrupt change in the orientation of liquid crystal molecules. Such boundary is called a "disclination". The optical properties of adjacent domains are not exactly the same, while at the disclinations optical aberrations occur. This leads to an increased cross-talk when the 3D view mode has been switched to, and to a lower image quality when the 2D view mode has been switched to.

In conventional electrically switchable 2D/3D displays, disclinations are a problem. They form upon switching from one liquid crystalline orientation to the other. Moreover, this is usually not limited to a single occurrence in a particular display. Disclinations may well appear at multiple positions on the display. Besides their formation, their persistence is also problematic, since many disclinations stand firm on the longer term, e.g. more than one minute, more than ten minutes or even permanently.

To date, some efforts have been deployed to reduce or even completely prevent the formation of disclinations. For example, it has been tried to apply the electrical field with a particular profile by imposing a voltage with a specific ramp so that he switching occurs gradually instead of instantaneously (see e.g. WO2020135731). Although this relieves the problem to a certain extent, its implementation falls short.

A concrete drawback is that the 2D/3D switching takes more time when using a voltage ramp. During that time, typically 5 to 30 seconds, the performance of the display is impaired, in particular there is an increased level of cross-talk. Also, a specific voltage ramp must be carefully programmed and tested for each new model type, while production variations may easily cause a mismatch between the behavior of the liquid crystal medium and the voltage ramp.

SUMMARY OF THE INVENTION

It is therefore an object of the present invention to provide an electrically switchable 2D/3D display wherein disclinations do not form upon switching, or at least to a lesser extent than in known switching processes. For example, the disclinations are decreased in size, number and/or duration. It is also an object that the disclinations exist only for a time span that is too short to be perceived as problematic. It is also an object to provide a solution that is less complicated than solutions known in the art. It is more generally an object of the present invention to improve the viewing experience of a viewer of an autostereoscopic display.

It has now been found that one or more of these objects can be reached by adapting the polarization direction of the display output.

Accordingly, the present invention relates to a method for reducing disclinations in an autostereoscopic display device

(11) that is electrically switchable between a first view mode and a second view mode, the autostereoscopic display device (11) comprising a display panel (1) comprising an array of display pixel elements for producing a display output;

a linear polarizer that is configured to filter the display output into a well-defined polarization direction;

a lenticular device (2) provided over the display panel (1) that is electrically switchable to provide the first view mode or the second view mode, the lenticular device (2) comprising a first optically transparent substrate (4) comprising an array of lenticular elements, wherein the lenticular elements have a first inner surface (4a) with liquid crystal alignment properties having a first direction of liquid crystal alignment;

a second optically transparent substrate (5) having an outer surface (5b) facing the linear polarizer and configured to receive the display output;

a second inner surface (5a) with liquid crystal alignment properties having a second direction of liquid crystal alignment that coincides with the polarization direction of the linear polarizer, the first inner surface (4a) and the second inner surface (5a) facing each other;

a first planar switching electrode (6) arranged at a side of the first optically transparent substrate (4);

a second planar switching electrode (7) arranged at a side of the second optically transparent substrate (5);

a liquid crystal medium (8) comprising liquid crystal molecules (9), the liquid crystal medium being sandwiched between the two substrates (4, 5) and being in contact with the first inner surface (4a) and the second inner surface (5a), wherein in the first view mode, the liquid crystal molecules (9) are lying in the plane of the two planar switching electrodes (6, 7); and in the second view mode, the liquid crystal molecules (9) are oriented normal to the two planar switching electrodes (6, 7);

a means (3) for applying a switching voltage across both planar switching electrodes (6, 7) to effect the switching from the first view mode to the second view mode; wherein, in the first view mode, the liquid crystal molecules (9) define a helix (10) with a helical twist that is defined by an angle between the first direction of liquid crystal alignment and the second direction of liquid crystal alignment; wherein the method comprises varying the angle between the first direction of liquid crystal alignment and the second direction of liquid crystal alignment in the lenticular device (2), to thereby determine an angle that causes a minimal or an acceptable occurrence of disclinations after switching from the first view mode to the second view mode.

The present invention further relates to an autostereoscopic display device (11) that is electrically switchable between a first view mode and a second view mode, the autostereoscopic display device (11) comprising a display panel (1) comprising an array of display pixel elements for producing a display output;

a linear polarizer that is configured to filter the display output into a well-defined polarization direction;

a lenticular device (2) provided over the display panel that is electrically switchable to provide the first view mode or the second view mode, the lenticular device (2) comprising a first optically transparent substrate (4) comprising an array of lenticular elements, wherein the lenticular elements have a first inner surface (4a) with liquid crystal alignment properties having a first direction of liquid crystal alignment;

a second optically transparent substrate (5) having an outer surface (5b) facing the linear polarizer and configured to receive the display output;

a second inner surface (5a) with liquid crystal alignment properties having a second direction of liquid crystal alignment that coincides with the polarization direction of the linear polarizer, the first inner surface (4a) and the second inner surface (5a) facing each other;

a first planar switching electrode (6) arranged at a side of the first optically transparent substrate (4);

a second planar switching electrode (7) arranged at a side of the second optically transparent substrate (5);

a liquid crystal medium (8) comprising liquid crystal molecules (9), the liquid crystal medium being sandwiched between the two substrates (4, 5) and being in contact with the first inner surface (4a) and the second inner surface (5a), wherein in the first view mode, the liquid crystal molecules (9) are lying in the plane of the two planar switching electrodes (6, 7); and in the second view mode, the liquid crystal molecules (9) are oriented normal to the two planar switching electrodes (6, 7);

a means (3) for applying a switching voltage across both planar switching electrodes (6, 7) to effect the switching from the first view mode to the second view mode; wherein in the first view mode, the liquid crystal molecules (9) define a helix (10) with a helical twist that is defined by the angle between the first direction of liquid crystal alignment and the second direction of liquid crystal alignment;

the angle between the first direction of liquid crystal alignment and the second direction of liquid crystal alignment is in the range of 4-86°.

The angle is in particular an angle that causes a minimal or an acceptable occurrence of disclinations after the autostereoscopic display device (11) has been switched from the first view mode to the second view mode.

DETAILED DESCRIPTION OF THE INVENTION

Figure 1:
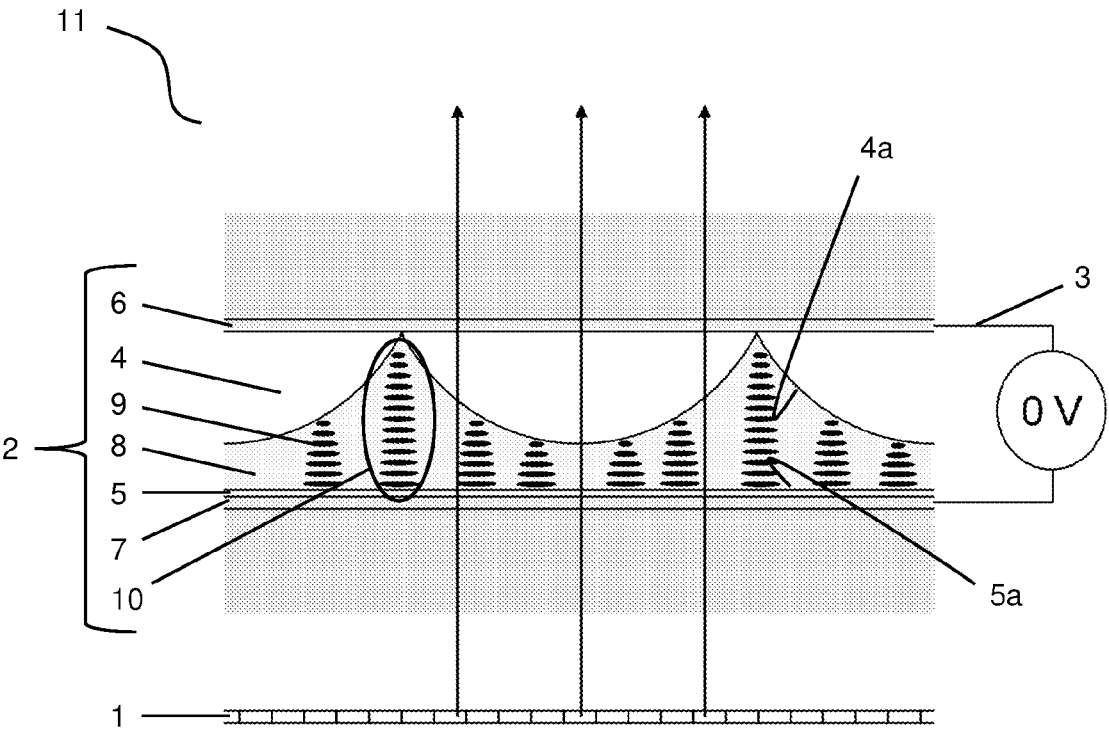
FIG. 1 schematically displays a known autostereoscopic display device (11) in a first view mode.

Elements in the figures are illustrated for simplicity and clarity and have not necessarily been drawn to scale. For example, the dimensions of some of the elements in the figure may be exaggerated relative to other elements to help improve understanding of various exemplary embodiments of the present invention. For example, the relative dimensions of the schematic liquid crystal molecules and the lenticular elements with respect to other components of an autostereoscopic display device cannot be derived from the figures. Also, angles that can be derived from the figures do not necessarily have the same value as the exemplary values that are reported in the description for these angles.

Further, the terms "first", "second", and the like in the present description and claims, if any, are generally used for distinguishing between similar elements and not necessarily for describing a sequential or chronological order.

In the context of the invention, by the term 'viewer' is meant a person who can consume, in particular view, content presented by an autostereoscopic display device. Throughout the text, references to the viewer will be made by male words like 'he', 'him' or 'his'. This is only for the purpose of clarity and conciseness, and it is understood that female words like 'she', and 'her' equally apply.

In the context of the invention, by the term 'twist' or 'helical twist' is meant the absolute and total angle over which a helix is twisted, determined from a begin of the helix to an end of the helix. The twist of a helix that is formed by liquid crystal molecules in a known lenticular device is normally between 0 and 180°, in particular between 0 and 90°. In a lenticular device (2) according to the invention, the twist is in the range of 4-86°. As the helix is present between the first inner surface (4a) and the second first inner surface (5a), the begin and the end of the helix are marked by these two surfaces.

It is understood that the liquid crystal medium is a birefringent material, having a first refraction index for light travelling along the director of the liquid crystal medium and a second refraction index for light travelling perpendicular to the director of the liquid crystal medium. When the term 'refraction index' is used throughout the text in relation to the liquid crystal medium, then—unless expressly stated otherwise—this refers to the refraction index of the liquid crystal medium in the direction normal to the planar switching electrodes, i.e. in the direction wherein the display output travels. This refraction index may refer to the first refraction index or the second refraction index as defined above, depending on the electrical field that is applied across the liquid crystal medium.

An autostereoscopic display device (11) that is used in a method of the invention comprises three main elements (1, 2, 3). These elements are also displayed in FIGS. 1 and 2:

the display panel (1), serving the purpose of providing linearly polarized display output (i.e. light);

the lenticular device (2) that is provided over the display panel (1), which can switch between optical properties that direct the linearly polarized pixel output to a viewer either as a single image (two-dimensional view), or as a left image and a right image (three-dimensional view or autostereoscopic view);

the means (3) for applying a switching voltage across two planar switching electrodes (6, 7) to allow switching between these two optical properties.

In the lenticular device (2), the liquid crystal medium (8) is present between two opposing surfaces, i.e. it is in contact with both surfaces. These concern the first inner surface (4a), which is a lenticular surface of the array of lenticular elements (which array is part of the first optically transparent substrate); and the second inner surface (4b), which is a flat surface of the second optically transparent substrate. Both inner surfaces (4a, 4b) have liquid crystal alignment properties; those of first inner surface (4a) have a first direction of liquid crystal alignment and those of second inner surface (4b) have a second direction of liquid crystal alignment. Display output enters the liquid crystal medium (8) via its interface with the second inner surface (4b) and egresses from the liquid crystal medium (8) via its interface with the first inner surface (4a). The display output then travels through a lenticular element.

Preferably, the first direction of liquid crystal alignment (which is on the lenticular surface) is usually parallel to a longitudinal direction of the lenticular elements. This is because introducing a direction of liquid crystal alignment is performed by rubbing a surface in the direction that is intended for the alignment. When a surface of lenticular elements needs to be rubbed, then it is advantageous to rub in the lenticular direction rather than rubbing under angle to the lenticular direction.

The first optically transparent substrate (4) has an outer surface facing a viewer of the autostereoscopic display device (11) and the second optically transparent substrate (5) has an outer surface facing the display element (1).

The liquid crystal medium (8) comprises liquid crystal molecules (9). The two planar switching electrodes (6, 7) are positioned on either side of the liquid crystal medium (8), so that they can apply an electrical field across the liquid crystal medium (8). The liquid crystal molecules (9) are capable of being oriented in the plane of the planar switching electrodes (6, 7) under the influence of both surfaces' alignment properties; or normal to the plane of the planar switching electrodes (6, 7) under the influence of a voltage that is applied across both switching electrodes (6, 7). When the voltage is sufficiently reduced, preferably completely removed, then the liquid crystal molecules are capable of reverting to the orientation in the plane of the planar switching electrodes, obeying both surfaces' alignment properties.

Figure 2:
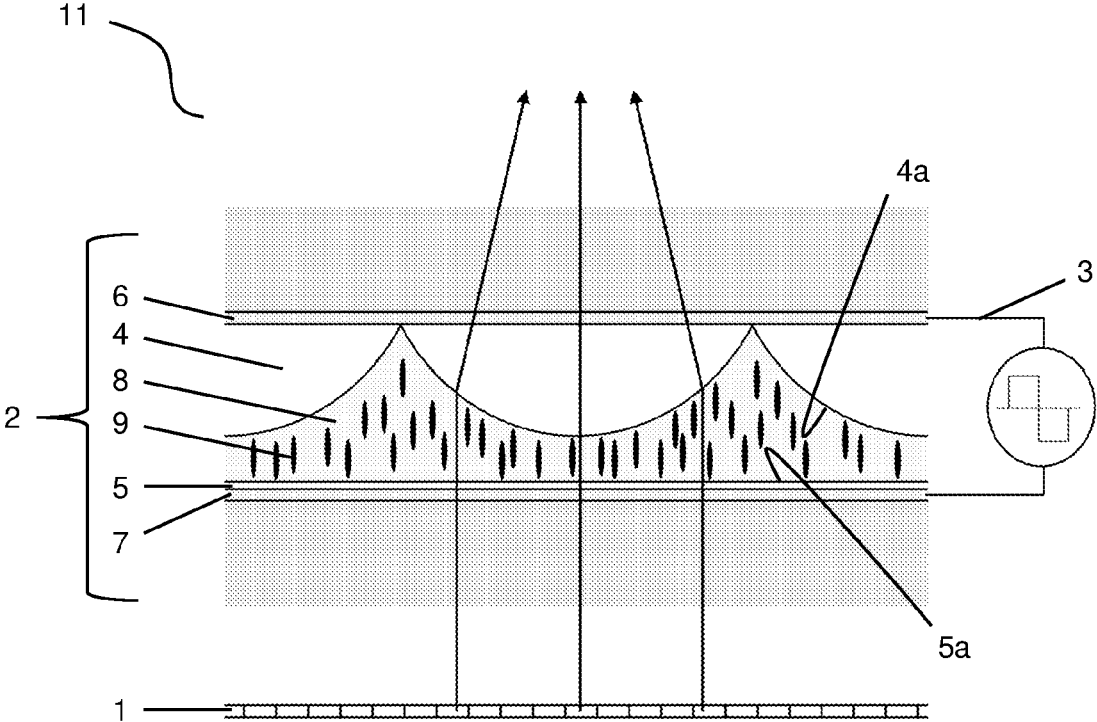
FIG. 2 schematically displays a known autostereoscopic display device (11) in a second view mode.

The planar orientation and the normal orientation are illustrated in FIG. 1 and FIG. 2, respectively, which are cross-sectional views of a known autostereoscopic display device (11). The liquid crystal molecules (9) in FIG. 1 have their elongate direction in a plane which is parallel to the plane of the planar switching electrodes (first view mode). The means (3) do not apply a voltage. The liquid crystal molecules (9) have a varying direction in that plane, which manifests as their presence in the form of a helix (10), as will be further explained below. The liquid crystal molecules (9) in FIG. 2 have their elongate direction perpendicular to the plane of the planar switching electrodes (second view mode). The means (3) apply an AC switching voltage.

In the absence of an electrical potential, the molecules orient in the plane of the planar switching electrodes and in accordance with the liquid crystal alignment properties of the first and the second surface, defining a first view mode. When a sufficiently strong electrical potential is applied (the 'switching voltage') they switch to an orientation in line with the corresponding electrical field, which is normal to the plane of the planar switching electrodes, defining a second view mode. Thus, the switching voltage is a voltage at which the autostereoscopic display device changes to and stays in its second view mode. There is usually a threshold voltage above which the change to the second view mode takes place. So, the switching voltage is in principle any voltage above this threshold voltage.

The autostereoscopic display device may be configured such that the first view mode corresponds to optical properties that provide a two-dimensional view; and that the second view mode corresponds to optical properties that provide a three-dimensional view. Alternatively, it may be configured such that the first view mode corresponds to optical properties that provide a three-dimensional view; and that the second view mode corresponds to optical properties that provide a two-dimensional view.

In a view mode wherein a three-dimensional view is provided, the lenticular device (2) comprises optical properties that allow directing the display output from different display pixel elements to different spatial positions within a field of view of the autostereoscopic display device (11), to allow a display of a stereoscopic image that is composed of a left image and a right image.

As stated above, the liquid crystal medium is sandwiched between two surfaces, i.e. the first and the second inner surface, each of which has liquid crystal alignment properties. The display output of the display panel first crosses the second inner surface and thereafter the first inner surface. The liquid crystal alignment of the second inner surface (i.e. the second direction of liquid crystal alignment) has to be in line with the polarization direction of the linear polarizer, so that the display output that enters the liquid crystal medium is linearly polarized in the (average) direction of the long molecular axes of the liquid crystal molecules (i.e. the director). In this way, the display output 'sees' the intended refractive index of the liquid crystal medium.

There is however an exception to the above statement that the polarization direction of the linear polarizer is in the same direction as the second direction of liquid crystal alignment. This is the case when a so-called 'polarization rotator' is positioned in between the linear polarizer and the second inner surface, which is a means that is capable of rotating the polarization direction of light that is travelling through it. The polarization rotator would then rotate the polarization direction of the light that egresses from the linear polarizer to the second direction of liquid crystal alignment. Such polarization rotator may be provided as a foil or an optical plate wherein the rotation properties are contained in the material of the foil or optical plate; or it may be provided in the form of a liquid crystal cell that works via the same principle of helical liquid crystal alignment as in the lenticular device of the invention (except, of course, that the lenticular elements are lacking).

An angular coincidence with the polarization direction of the display output is however not necessary for the first inner surface, where the display output egresses from the liquid crystal medium. The first inner surface may have alignment properties in another direction than those of the of the second inner surface. As a result, the liquid crystal molecules that are stacked between both surfaces gradually follow this change in direction by forming a helix. This is illustrated in e.g. FIG. 1, which shows an autostereoscopic display device (11) comprising a lenticular device (2) wherein the helix is viewed from a side, with the helical axis parallel to the plane in which the figure is presented and perpendicular to the plane of the planar switching electrodes (the apparently shorter molecules (9) are not in the plane in which the figure is presented, while the apparently longest molecules (9) are). The helical twist $\alpha_t$ of the helix is then defined as the angle between both directions of liquid crystal alignment (the angle between the two terminal molecules at each end of the helix). This is illustrated in FIG. 3, wherein the helical axis is perpendicular to the plane in which the figure is presented (FIG. 3 will be further explained below).

As long as the angle between two neighboring liquid crystal molecules in a helix does not exceed a certain (quantum mechanically defined) angle, the polarization of the display output follows the direction of the long molecular axes of the liquid crystal molecules along the helix towards the first inner surface. In this way, the travelling of display output through the liquid crystal medium effectively changes the polarization direction of the display output. An angle between both alignment directions then has no influence on the optical properties of the lenticular device (at least not on the properties that are relevant for a proper operation of the autostereoscopic display device). When this requirement is met, then the angle between both alignment directions may in principle be any angle between 0 and 180°.

Figure 3:
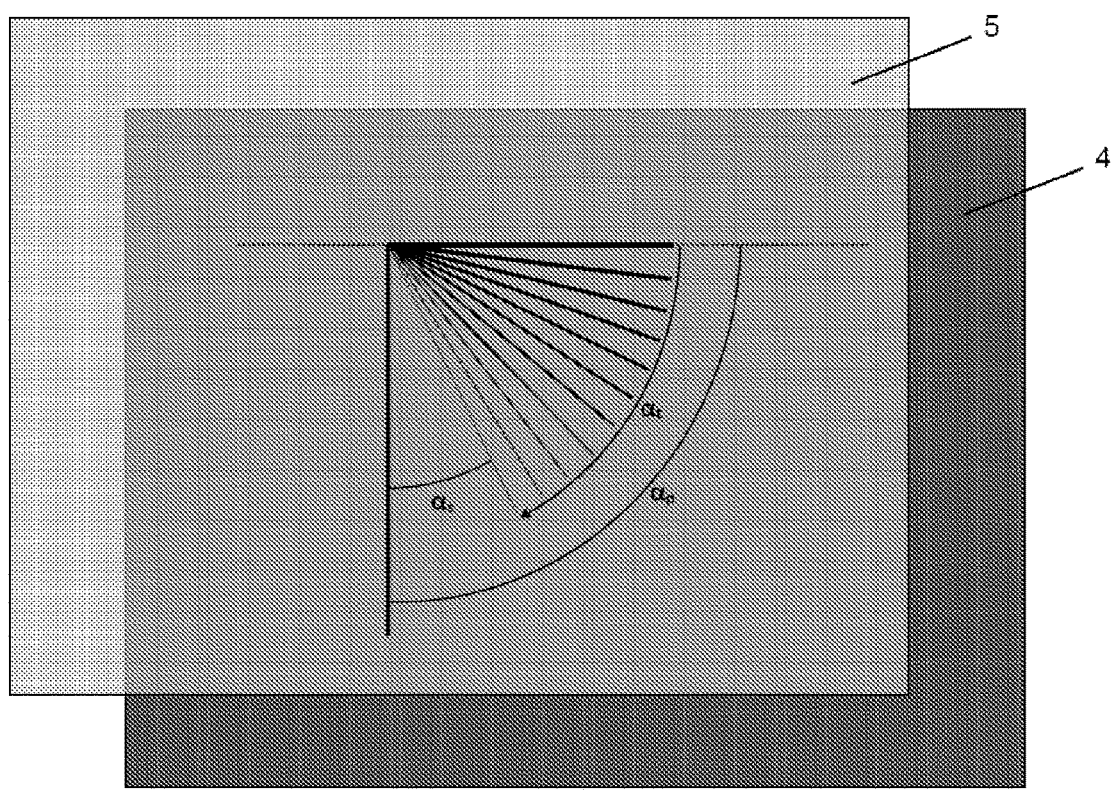
FIG. 3 displays a simplified representation of the lenticular device (2) of the autostereoscopic display device (11) of FIG. 1.

FIG. 3 displays a simplified representation of the lenticular device (2) of FIG. 1, showing only the first optically transparent substrate (4) and the second optically transparent substrate (5), which are parallel to the plane in which the figure is presented. For reasons of clarity, the array of lenticular elements is not shown in FIG. 3. The second optically transparent substrate (5) is shown on the foreground and has a horizontal liquid crystal alignment as well as a horizontal display polarization that are under an angle $\alpha_p$ with the vertical. The first optically transparent substrate (4) is shown in the background and has a liquid crystal alignment in the slant direction, which is under an angle $\alpha_s$ with the vertical. The entire twist $\alpha_t$ of the helix is indicated by ten stages that are progressively fading towards the background plate. This representation is reminiscent of the steps of a spiral staircase viewed from above.

It was however found by the inventors that certain angles between both alignment directions cause more disclinations than other angles upon switching from the first view mode to the second view mode, i.e. when the liquid crystal molecules are switched from an orientation in the plane of the switching electrodes (with the particular helical stacking) to an orientation normal to the two planar switching electrodes. It appeared possible to arrive at an optimal angle between both alignment directions so as to minimize or even completely cancel the issues with respect to disclinations. In particular, it appeared that one or more of the following occurred: reduction of their size, reduction of their number (e.g. per switching event per autostereoscopic display device) and reduction of their duration.

Switching in the reverse direction, i.e. from the second view mode to the first view mode, generally does not appear to give rise to disturbing disclinations (no matter what the actual twist $\alpha_t$ of the helix is).

Accordingly, a method of the invention comprises varying the angle between the first direction of liquid crystal alignment and the second direction of liquid crystal alignment in the lenticular device, to thereby determine an angle that causes a minimal occurrence or a (to a viewer) acceptable occurrence of disclinations after switching from the first view mode to the second view mode.

In practice, this usually comes down to varying the angle between the polarization direction of the linear polarizer in the display panel and the first direction of liquid crystal alignment, because the polarization direction of the linear polarizer in the display panel and the second direction of liquid crystal alignment are coupled (unless a polarization rotator is present as explained above).

Figure 4:
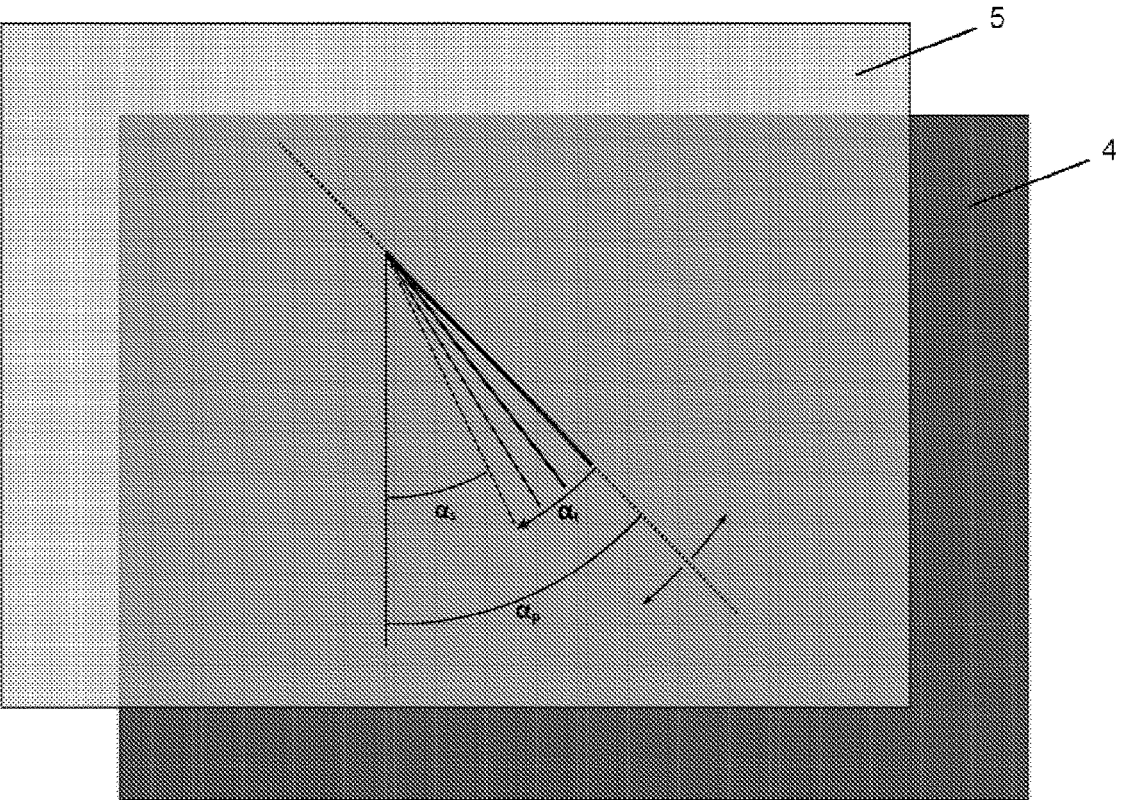
FIG. 4 displays a simplified representation of a lenticular device (2), obtained as a result of the method of the invention.

The outcome of a method of the invention is schematically displayed in FIG. 4. Herein the same lenticular device is shown as in FIG. 3, with the exception that the second direction of liquid crystal alignment and the display polarization are under a smaller angle $\alpha_p$ with the vertical. This has the result that the twist $\alpha_t$ of the helix is reduced accordingly (as the angle of the first direction of liquid crystal alignment and the slant $\alpha_s$ remained unchanged).

This reduced angle of helical twist $\alpha_r$ was obtained after it had been determined that it causes no occurrence of disclinations after switching from the first view mode to the second view mode (see also the Example). The two opposite arrows on both sides of the polarization direction indicate that an iterative process may be applied wherein the angle $\alpha_p$ is varied multiple times; and that after each time the occurrence of disclinations is determined and a decision is made on whether to proceed with optimizing the angle.

In the method of the invention, a minimal occurrence or an acceptable occurrence of disclinations is meant to include at least one of the following:

a minimal size or an acceptable size of disclinations;

a minimal number or an acceptable number of disclinations (wherein the number is e.g. the number per autostereoscopic display device or per unit of surface area of the array of lenticular elements);

a minimal duration or an acceptable duration of disclinations.

Herein, the term 'minimal occurrence of disclinations' may also include the complete absence of disclinations.

Usually, a minimal occurrence of disclinations comprises a minimal size and a minimal number and a minimal duration of disclinations.

Usually, an acceptable occurrence of disclinations comprises an acceptable size and an acceptable number and an acceptable duration of disclinations.

A person skilled in the art knows how to perform the method of the invention (in particular determining an optimal angle or an angle that causes an acceptable occurrence of disclinations) by routine experimentation and without exerting an inventive effort, as is evidenced by the Example. For example, he creates an experimental set-up wherein he can vary the angle or he manufactures a plurality of autostereoscopic display devices, each having a different angle. For every angle, he performs the switching of the autostereoscopic display device and then observes whether or not disclinations are formed, in particular whether or not their size, number and/or duration follows a certain trend towards a certain minimum.

The angle between both alignment directions is preferably varied by changing the second direction of liquid crystal alignment relative to the rest of the autostereoscopic display device. In other words, varying the angle between the first direction of liquid crystal alignment and the second direction of liquid crystal alignment in the lenticular device preferably comprises varying the second direction of liquid crystal alignment relative to the display panel and relative to the first direction of liquid crystal alignment.

Usually, this comprises simultaneously changing the polarization direction of the linear polarizer to the same extent, since both directions need to be aligned. Accordingly, varying the angle between both directions of liquid crystal alignment may further comprise varying the polarization direction of the linear polarizer to the same extent as the extent to which the second direction of liquid crystal alignment is varied, so that the second direction of liquid crystal alignment (still) coincides with the polarization direction of the linear polarizer.

As explained above, it is however also possible to position a polarization rotator in between the linear polarizer and the second inner surface. This eliminates the need of simultaneously changing the polarization direction of the linear polarizer, because it can compensate for any discrepancy in the direction of polarization and the direction of liquid crystal alignment.

Another possibility to vary the angle is by changing the first direction of liquid crystal alignment relative to the rest of the autostereoscopic display device. In other words, varying the angle between the first direction of liquid crystal alignment and the second direction of liquid crystal alignment in the lenticular device then comprises varying the first direction of liquid crystal alignment relative to the display panel and relative to the second direction of liquid crystal alignment.

However, changing the first direction of liquid crystal alignment almost inevitably requires that the direction of the lenticulars (i.e. their slant) is changed by the same extent, because it is highly preferred that the liquid crystal alignment on the lenticulars is in the elongate direction of the lenticulars. Changing the direction of the lenticulars relative to the rest of the device (and thus relative to the array of pixels) is however undesired, because only a few combinations of pixel pitch and lenticular slant are possible for a lenticular liquid crystalline cell to operate well—most combinations do not yield a usable imaging. Also, the choice of pixel pitch and matching lenticular slant determine the resolution in the 3D view mode and the optimal viewing distance. Moreover, the range over which the slant can be varied is 80° (namely 0-40° on both sides of a vertical direction), so an optimal helical twist is not even accessible when it requires a slant that falls outside this range.

Thus, in summary, it is highly preferred that during varying the angle between both alignment directions, the relative positioning of the array of lenticulars and the array of display pixel elements remains unaltered, i.e. that the second direction of liquid crystal alignment is varied relative to the rest of the autostereoscopic display device. When no polarization rotator is present, then the polarization direction of the linear polarizer needs to vary accordingly. When a polarization rotator is present, it can overcome any discrepancy between both directions so that they can be chosen independently of one another.

Since the linear polarizer needs to be integrated in the display panel when the display panel is a liquid crystal display (LCD), changing the polarization direction of the linear polarizer typically requires a new design of the LCD. This is however not the case when the display panel is an organic light-emitting diode (OLED) display, because an OLED does not require a polarizer for producing display output. As a result, the polarization direction of the linear polarizer can freely be chosen without the need to redesign the OLED display. This makes that it is preferred that the display panel in a method of the invention comprises an OLED display rather than an LCD.

The disadvantage of using an LCD can however be relieved when a polarization rotator is used, because this allows that the second direction of liquid crystal alignment can be chosen independently of the polarization direction of the linear polarizer that is integrated in the LCD.

The display panel may comprise a liquid crystal display (LCD) or an organic light-emitting diode (OLED) display. When the display panel comprises an OLED display, it preferably also comprises a quarter waveplate. This is because such plate acts, in combination with the linear polarizer in the display panel, as an antireflective means for a viewer. Without such means, the OLED display may act as a mirror. Reflections of ambient light caused by such mirror are usually visible to a viewer of the autostereoscopic display device, which he will likely experience as disturbing. The displayed images loose contrast and/or blackness due to the additional light of the reflections.

The invention further relates to an autostereoscopic display device that is electrically switchable between a first view mode and a second view mode, wherein the device has an angle between a first direction of liquid crystal alignment and a second direction of liquid crystal alignment that causes a minimal or an acceptable occurrence of disclinations after switching from the first view mode to the second view mode. Such device is typically a device that is used in the method as described hereabove.

The display panel may comprise a liquid crystal display (LCD) or an organic light-emitting diode (OLED) display. For the same reasons at outlined above, the display panel preferably comprises an OLED display.

Disclinations appear to occur especially when the angle between the first direction of liquid crystal alignment and the second direction of liquid crystal alignment is 0° or 90°. Disclinations usually also occur when the angle is between 0° and 4° or between 86° and 90°.

Therefore, in an autostereoscopic display device of the invention, the angle between the first direction of liquid crystal alignment and the second direction of liquid crystal alignment is in the range of 4-86°, in particular in the range of 5-85°.

It was more in particular found that angles below 45° are effective in reducing disclinations. The angle is therefore preferably in the range of 5-40°, for example in the range of 5-35°, 5-30°, 5-25°, 5-20° or 5-15°. It is more preferably in the range of 10-25°, for example in the range of 10-20°.

In an autostereoscopic display device of the invention, a polarization rotator may be positioned in between the linear polarizer and the second inner surface, compensating for any discrepancy in 1) the direction of polarization of the linear polarizer and 2) the second direction of liquid crystal alignment.

Usually, the shortest distance between the first inner surface and the second inner surface is in the range of 5.0-50 μm. This is typically the distance between the apex of the lenticular elements and the (flat) second optically transparent substrate.

Example

1. Comparative Autostereoscopic Display Device Known in the Art

A switchable autostereoscopic display device of 15.6" diagonal diameter was prepared. The cell gap between the top of the lens (the lenticular apex) and the opposing plate is 10 micron and contains a liquid crystal medium with a birefringence of 0.12. The device has a horizontal display polarization, i.e. the display output has a horizontal polarization when it meets the liquid crystal medium. Further, the device has a lenticular slant angle $\alpha_s$ of 16.7° with respect to the vertical axis. With the liquid crystal alignment in the same direction as the slant direction, it follows that the twist $\alpha_t$ of helically arranged liquid crystal molecules is 73.3° over the entire cell gap (between the first inner surface and the second inner surface).

This is schematically shown in FIG. 3, which shows a foreground plate (5) with a horizontal alignment along the horizontal display polarization under an angle $\alpha_p$ with the vertical ($\alpha_p=$) 90°; and a background plate (4) with the alignment in the slant direction at an angle $\alpha_s$ with the vertical ($\alpha_s=16.7°$). The entire twist $\alpha_t$ between both plates (4, 5) is indicated by ten stages that are progressively fading towards the background plate ($\alpha_t=73.3°$), like the steps of a spiral staircase.

Figure 5:
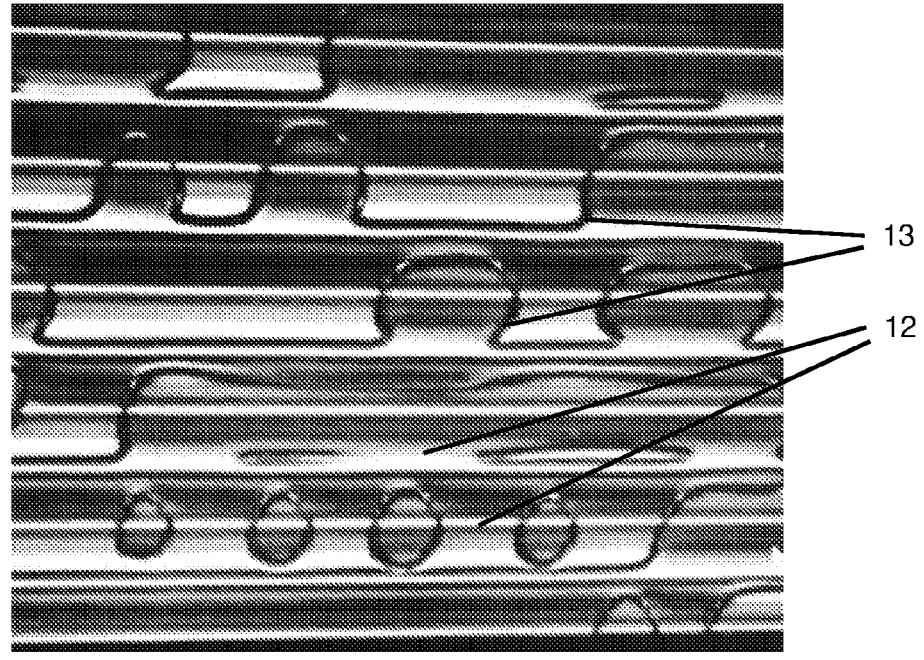
FIG. 5 is a microscope picture of a known lenticular device (2) that produces disclinations after switching from the first view mode to the second view mode.

This autostereoscopic display device exhibits very persistent disclinations after switching from the first view mode (helical liquid crystal alignment along a helical axis perpendicular to the planar electrodes) to the second view mode (liquid crystal alignment perpendicular to the planar electrodes). These disclinations are displayed in the micrograph of FIG. 5, wherein the regular shapes (12) from left to right represent the lenticulars and the curved lines (13) represent the boundaries between different liquid crystal domains with different liquid crystal orientations (i.e. they represent the actual disclinations). To clear the disclinations, a ramp voltage was applied during a time period of 20 seconds, before reaching the final switching voltage. During that time period, significant crosstalk was observed. This decreased to normal and acceptable values only well after this period. Furthermore, it was observed that some disclinations even persisted after the reaching the final switching voltage.

2. Autostereoscopic Display Device of the Invention

The method of the invention was applied in order to arrive at a display device which exhibits less disclinations upon switching from the first view mode to the second view mode. To this end, an autostereoscopic display device was prepared with a display polarization $\alpha_p=32°$ with respect to the vertical axis, yielding a twist $\alpha_t=15.3°$ (display polarization of 32° minus the slant direction of 16.7°). In this cell, no disclinations appeared during or after the switching. Further, a switching delay (ramp voltage) appeared not necessary and no initial increase of crosstalk was observed.

This is illustrated in FIG. 4, wherein the direction of liquid crystal alignment and display polarization is under an angle $\alpha_p$ of 32°, rather than the 90° of FIG. 3. This results in a twist $\alpha_t$ of 15.3°, rather than the 73.3° of FIG. 3. This smaller twist $\alpha_t$ is favorable since it does not give rise to disclinations, in contrast to the larger twist of FIG. 3.

Thus, this autostereoscopic display device according to the invention exhibits essentially no disclinations upon the switching, which makes it a huge improvement over known 2D/3D switchable autostereoscopic display devices.

The invention claimed is:

1. A method for reducing disclinations in an autostereoscopic display device that is electrically switchable from a first view mode to a second view mode, the autostereoscopic display device comprising:

a display panel, the display panel comprising an array of display pixel elements for producing a display output, the display panel further comprising a linear polarizer configured to filter the display output into a well-defined polarization direction;

a lenticular device provided over the display panel, the lenticular device being electrically switchable to provide the first view mode or the second view mode, the lenticular device comprising a first optically transparent substrate, the first optically transparent substrate comprising an array of lenticular elements, the lenticular elements having a first inner surface with liquid crystal alignment properties having a first direction of liquid crystal alignment, the lenticular device further comprising a second optically transparent substrate, the second optically transparent substrate having an outer surface facing the linear polarizer, the outer surface being configured to receive the display output, the second optically transparent substrate having a second inner surface with liquid crystal alignment properties having a second direction of liquid crystal alignment that coincides with the polarization direction of the linear polarizer, the first inner surface and the second inner surface facing each other, the lenticular device further comprising a first planar switching electrode arranged at a side of the first optically transparent substrate, the lenticular device further comprising a second planar switching electrode arranged at a side of the second optically transparent substrate, the lenticular device further comprising a liquid crystal medium comprising liquid crystal molecules, the liquid crystal medium being sandwiched between the two-substrates first optically transparent substrate and the second optically transparent substrate and being in contact with the first inner surface and the second inner surface, wherein when the autostereoscopic display device is in the first view mode, the liquid crystal molecules are lying in a plane of the two planar switching electrodes, wherein when the autostereoscopic display device is in the second view mode, the liquid crystal molecules are oriented normal to the two planar switching electrodes; and a means for applying a switching voltage between the first planar switching electrode and the second planar switching electrode to cause the switching from the first view mode to the second view mode, wherein when the autostereoscopic display device is in the first view mode, the liquid crystal molecules define a helix with a twist that is defined by an angle between the first direction of liquid crystal alignment and the second direction of liquid crystal alignment;

wherein the method comprises varying the angle between the first direction of liquid crystal alignment and the second direction of liquid crystal alignment in the lenticular device, to thereby determine an angle that causes a minimal or an acceptable occurrence of disclinations after switching from the first view mode to the second view mode.

2. The method of claim 1, wherein a minimal or an acceptable occurrence of disclinations comprises at least one of:

a minimal or an acceptable size of disclinations, minimal or an acceptable number of disclinations, or a minimal or an acceptable duration of disclinations.

3. The method of claim 1, wherein the display panel comprises a liquid crystal display (LCD).

4. The method of claim 1, wherein the display panel comprises an organic light-emitting diode (OLED) display.

5. The method of claim 4, wherein the display panel comprises an OLED display and a quarter waveplate.

6. The method of claim 1, wherein varying the angle between the first direction of liquid crystal alignment and the second direction of liquid crystal alignment in the lenticular device comprises varying the second direction of liquid crystal alignment relative to the display panel and relative to the first direction of liquid crystal alignment.

7. The method of claim 6, wherein varying the angle further comprises varying the polarization direction of the linear polarizer to the same extent as the extent of varying the second direction of liquid crystal alignment.

8. The method of claim 1, wherein the autostereoscopic display device further comprises a polarization rotator positioned between the linear polarizer and the second inner surface, the polarization rotation being configured to compensate for any discrepancy between the direction of polarization of the linear polarizer and the second direction of liquid crystal alignment.

9. The method of claim 1, wherein varying the angle between the first direction of liquid crystal alignment and the second direction of liquid crystal alignment in the lenticular device comprises varying the first direction of liquid crystal alignment relative to the display panel and relative to the second direction of liquid crystal alignment.

10. An autostereoscopic display device that is electrically switchable from a first view mode to a second view mode, the autostereoscopic display device comprising:

a display panel, the display panel comprising an array of display pixel elements for producing a display output, the display panel further comprising a linear polarizer configured to filter the display output into a well-defined polarization direction;

a lenticular device provided over the display panel, the lenticular device being electrically switchable to provide the first view mode or the second view mode, the lenticular device comprising a first optically transparent substrate, the first optically transparent substrate comprising an array of lenticular elements, the lenticular elements having a first inner surface with liquid crystal alignment properties having a first direction of liquid crystal alignment, the lenticular device further comprising a second optically transparent substrate, the second optically transparent substrate having an outer surface facing the linear polarizer, the outer surface being configured to receive the display output, the second optically transparent substrate having a second inner surface with liquid crystal alignment properties having a second direction of liquid crystal alignment that coincides with the polarization direction of the linear polarizer, the first inner surface and the second inner surface facing each other, the lenticular device further comprising a first planar switching electrode arranged at a side of the first optically transparent substrate, the lenticular device further comprising a second planar switching electrode arranged at a side of the second optically transparent substrate the lenticular device further comprising a liquid crystal medium comprising liquid crystal molecules, the liquid crystal medium being sandwiched between the first optically transparent substrate and the second optically transparent substrate and being in contact with the first inner surface and the second inner surface, wherein when the autostereoscopic display device is in the first view mode, the liquid crystal molecules are lying in a plane of the two planar switching electrodes wherein when the autostereoscopic display device is in the second view mode, the liquid crystal molecules are oriented normal to the two planar switching electrodes; and a means for applying a switching voltage between the first planar switching electrode and the second planar switching electrode to cause the switching from the first view mode to the second view mode, wherein when the autostereoscopic display device is in the first view mode, the liquid crystal molecules define a helix with a twist that is defined by an angle between the first direction of liquid crystal alignment and the second direction of liquid crystal alignment, wherein the angle between the first direction of liquid crystal alignment and the second direction of liquid crystal alignment is between 4 degrees and 86 degrees, inclusive.

11. The autostereoscopic display device of claim 10, wherein the display panel comprises a liquid crystal display (LCD).

12. The autostereoscopic display device of claim 10, wherein the display panel comprises an organic light-emitting diode (OLED) display.

13. The autostereoscopic display device of claim 10, wherein the angle between the first direction of liquid crystal alignment and the second direction of liquid crystal alignment is between 5 degrees and 35 degrees, inclusive.

14. The autostereoscopic display device of claim 10, wherein the angle between the first direction of liquid crystal alignment and the second direction of liquid crystal alignment between 5 degrees and 25 degrees, inclusive.

15. The autostereoscopic display device of claim 10, further comprising a polarization rotator positioned between the linear polarizer and the second inner surface, the polarization rotation being configured to compensate for any discrepancy between the direction of polarization of the linear polarizer and the second direction of liquid crystal alignment.

16. The autostereoscopic display device of claim 10, wherein a shortest distance between the first inner surface and the second inner surface is between 5 microns and 50 microns, inclusive.

17. The autostereoscopic display device of claim 10, wherein the angle between the first direction of liquid crystal alignment and the second direction of liquid crystal alignment is between 10 degrees and 20 degrees, inclusive.

* * * * *